March 12, 1940.  D. STRINGHER  2,193,303
STABILIZING DEVICE FOR VEHICLES
Filed April 11, 1938
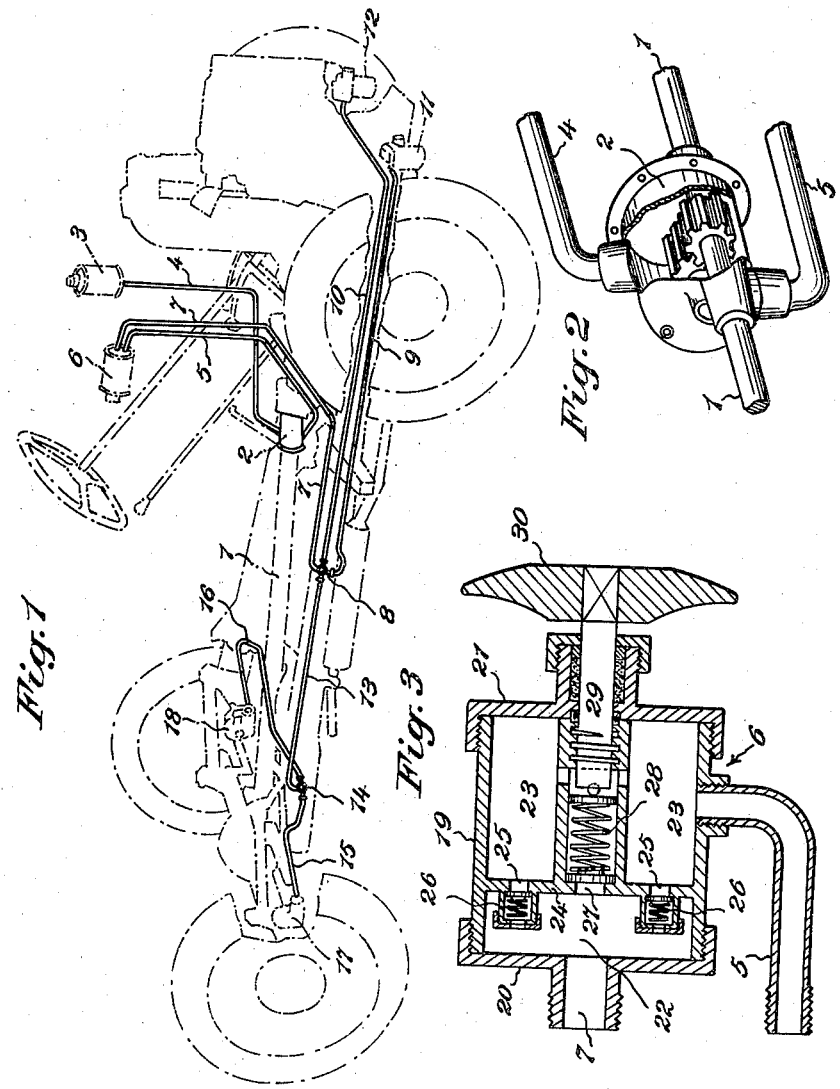

Patented Mar. 12, 1940

2,193,303

UNITED STATES PATENT OFFICE 2,193,303

STABILIZING DEVICE FOR VEHICLES

Diego Stringher, Rome, Italy

Application April 11, 1938, Serial No. 201,400
In Italy May 14, 1937

4 Claims. (Cl. 267—8)

This invention relates to a stabilizing device for vehicles in which the action of the shock absorbers of the vehicle is adjusted for various speeds.

An object of the invention is to provide a control mechanism for the stabilizing device for controlling the flow of fluid to the shock absorbers.

With these and other objects in view which will become apparent from the detailed description below a preferred form of the invention is shown in the drawing in which:

Figure 1 is a perspective view of the invention,

Figure 2 is a perspective view of the gear pump with parts broken away for greater clarity, and Figure 3 is a cross sectional view through the control device and the safety valve for regulating the flow of fluid from the pump.

Referring to the drawing in which similar reference characters are used for similar elements the transmission shaft of an automobile is shown at 1. Keyed to the shaft 1 is a gear pump 2 more fully shown in Figure 2. The pump 2 is fed from a supply tank 3 through a conduit 4. Leading from the pressure side of the pump is a conduit 5 connected to the control device 6 which is preferably mounted on the dashboard of the automobile. From the control device 6 a conduit 7 extends to a multiple way distribution element 8 and from the element 8 two conduits 9 and 10 extend to the front shock absorbers 11 and 12 while the conduit 13 extends rearwardly and is connected to the coupling 14 from which extends conduits 15 and 16 to the rear shock absorbers 17 and 18 of the vehicle.

The shock absorbers 11, 12, 17 and 18 comprise as known the usual cylinder and cooperating piston, which due to variations in the fluid pressure in the conduits 9, 10, 15 and 16 will cause a variation in the action of the shock absorbers. Since the pump 2 rotates in accordance with the speed of the vehicle, the pressure in the conduits is also a function of the speed of the vehicle and consequently the action of the shock absorbers is also a function of the speed of the vehicle.

Referring to Figure 3 the regulating or control device comprises a cylinder 19, which is closed at both ends by the covers 20 and 21. The cylinder is divided into two chambers 22 and 23 by the partition 24. This partition is provided with apertures 25 which are controlled by the one-way valves 26 permitting relatively free passage of the fluid from the chamber 23 to the chamber 22 but preventing passage in the opposite direction.

The partition 24 is also provided with a centrally positioned bore 27 controlled by a one-way valve 28, which permits passage of the fluid from chamber 22 to the chamber 23 and prevents return of the fluid from the chamber 23 to the chamber 22. The resistance opposed by the valve 28 to the passage of the fluid from the chamber 22 to the chamber 23 is regulated by the threaded rod 29 which can be actuated by the handle 30.

The regulating or control device 6 acts so that when there is an abrupt lowering of pressure in the conduit 5 owing either to a breakage of the pump 2 or to an abrupt reduction of the rotation speed of the shaft 1, the shock absorbers will not immediately lose the necessary rigidity which had been previously built up by the pressure existing in the conduit 5 and the conduits fed therefrom.

The form of the invention above described is a preferred form but it is obvious that various changes may be made therein. For instance, the pump 2 may be replaced by a hydraulic joint exercising a force or a torque of variable value on a mechanical transmission member which in turn controls the shock absorbers. Or an electric generator may be used in place of the pump 2 for controlling electrically operated elements operating the shock absorbers.

It is also obvious that instead of operating the pump 2 or equivalent devices from the transmission shaft 1 such pump or other devices may be connected with another rotating part of the vehicle which rotates in proportion to the speed of the vehicle. Furthermore the shock absorbers may be hydraulic or of the friction type.

When the oil pump is carried on the transmission shaft as shown a rotation of this shaft places the oil under pressure and such oil under pressure passing through the various conduits acts on the valves of the shock absorbers so as to vary the action of such shock absorbers.

In the case of shock absorbers which operate mechanically as, for instance those which are provided with friction discs, the pressure of the oil will act on a piston which will compress the movable discs against the fixed discs.

The regulating or control device 6 acts as follows: When the wheels of the vehicle are strongly braked and slide on the road the transmission shaft will be stopped and there will be an immediate lowering of the pressure of the fluid which is preferably oil. If the regulating device were not present there would be an immediate return to normal position of the shock absorbers while the vehicle is still advancing at relatively high speed. This would be extremely dangerous.

Therefore in the control device 6 the valve permits a free passage of the oil towards the shock absorbers while a passage of the oil in the opposite direction is opposed by the control valve 28. Therefore when the pump is abruptly stopped for any reason the pressure of the oil in the conduits between the regulating device 6 and the shock absorbers diminishes very slowly.

I claim:

1. A stabilizing device for vehicles comprising shock absorbers associated with the wheels of a vehicle, a member on said vehicle rotating proportionately to the speed of said vehicle, means cooperating with said member and connected to said shock absorbers for varying the shock absorption action of said shock absorbers in accordance with the speed of said vehicle, a control mechanism for said means, said control mechanism comprising a receptacle, a partition dividing said receptacle into two compartments, one of said compartments communicating with said means and the second compartment communicating with said shock absorbers and means controlling the flow of fluid between said compartments.

2. A stabilizing device for vehicles comprising shock absorbers associated with the wheels of a vehicle, a member on said vehicle rotating proportionately to the speed of said vehicle, means cooperating with said member and connected to said shock absorbers for varying the shock absorption action of said shock absorbers in accordance with the speed of said vehicle, a control mechanism for said means, said control mechanism comprising a receptacle, a partition dividing said receptacle into two compartments, one of said compartments communicating with said means and the second compartment communicating with said shock absorbers, one way valves controlling the flow of fluid from said first named compartment to said second compartment and manually controlled means controlling the flow of fluid from said second compartment to said first named compartment.

3. A stabilizing device for vehicles comprising shock absorbers associated with the wheels of a vehicle, a member on said vehicle rotating proportionately to the speed of said vehicle, means cooperating with said member and connected to said shock absorbers for varying the shock absorption action of said shock absorbers in accordance with the speed of said vehicle, a control mechanism for said means, said control mechanism comprising a receptacle, a partition dividing said receptacle into two compartments, one of said compartments communicating with said means and the second compartment communicating with said shock absorbers, one way valves controlling the flow of fluid from said first named compartment to said second compartment, a one way spring actuated valve controlling the flow of fluid from said second compartment to said first named compartment and means controlling the spring tension of said last named valve.

4. A stabilizing device for vehicles comprising shock absorbers associated with the wheels of a vehicle, a member on said vehicle rotating proportionately to the speed of said vehicle, means cooperating with said member and connected to said shock absorbers for varying the shock absorption action of said shock absorbers in accordance with the speed of said vehicle, a control mechanism for said means, said control mechanism comprising a receptacle, a partition dividing said receptacle into two compartments, one of said compartments communicating with said means and the second compartment communicating with said shock absorbers, one way valves controlling the flow of fluid from said first named compartment to said second compartment, a one way spring actuated valve controlling the flow of fluid from said second compartment to said first named compartment, and a manually operated screw threaded rod controlling the spring tension of said last named valve.

DIEGO STRINGHER.